United States Patent [19]

Usui et al.

[11] Patent Number: 4,815,192

[45] Date of Patent: Mar. 28, 1989

[54] METHOD OF SECURING AN ELONGATED VIBRATION AMPLIFIER MEMBER TO AN ANNULAR VIBRATING REED

[75] Inventors: Toshifumi Usui, Katsuta; Syozo Yanagisawa, Ibaraki; Hisanobu Kanamaru; Kazuhiro Tsuruoka, both of Katsuta, all of Japan

[73] Assignee: Hitachi, Ltd., Tokyo, Japan

[21] Appl. No.: 59,184

[22] Filed: Jun. 11, 1987

Related U.S. Application Data

[62] Division of Ser. No. 821,285, Jan. 22, 1986, abandoned.

[30] Foreign Application Priority Data

Jan. 23, 1985 [JP] Japan ................................. 60-9067

[51] Int. Cl.⁴ ...................... B21D 39/00; B23P 11/00
[52] U.S. Cl. .................................. 29/509; 29/157 R; 29/520; 239/102.1; 261/DIG. 48; 403/274
[58] Field of Search ................... 29/520, 509, 157 R, 29/432; 403/274, 284, 285; 261/DIG. 48; 239/102, 4

[56] References Cited

U.S. PATENT DOCUMENTS

| | | | |
|---|---|---|---|
| 1,396,611 | 11/1921 | White | 411/968 X |
| 1,693,839 | 12/1928 | Faudi | 29/509 |
| 2,147,343 | 2/1939 | Hokanson | 411/180 X |
| 2,537,723 | 1/1951 | Ward | 29/520 U X |
| 2,944,326 | 7/1960 | Stadthaus et al. | 29/520 X |
| 3,000,420 | 9/1961 | Spokes | 29/520 U X |
| 3,345,736 | 10/1967 | Jakeway | 29/520 X |
| 3,820,579 | 6/1974 | Barry | 29/432 X |
| 3,834,438 | 9/1974 | Ziaylek, Jr. | 411/968 X |
| 4,019,683 | 4/1977 | Asai et al. | 239/102 |
| 4,339,873 | 7/1982 | Kanamaru et al. | 29/520 X |
| 4,590,915 | 5/1986 | Yamauchi et al. | 261/DIG. 48 X |

FOREIGN PATENT DOCUMENTS

| | | | |
|---|---|---|---|
| 55836 | 6/1912 | Austria | 29/520 |
| 2038682 | 7/1980 | United Kingdom | 29/520 |

Primary Examiner—Charlie T. Moon
Attorney, Agent, or Firm—Antonelli, Terry & Wands

[57] ABSTRACT

A fuel atomizer in which one or more substantially recesses are formed at the distal end of a vibration amplifier member, and a part of wall material of a vibrating reed is caused to flow into those recesses due to plastic fluidity, thereby firmly fixing both the vibrating reed and the vibration amplifier member to each other.

4 Claims, 2 Drawing Sheets

FIG. 3
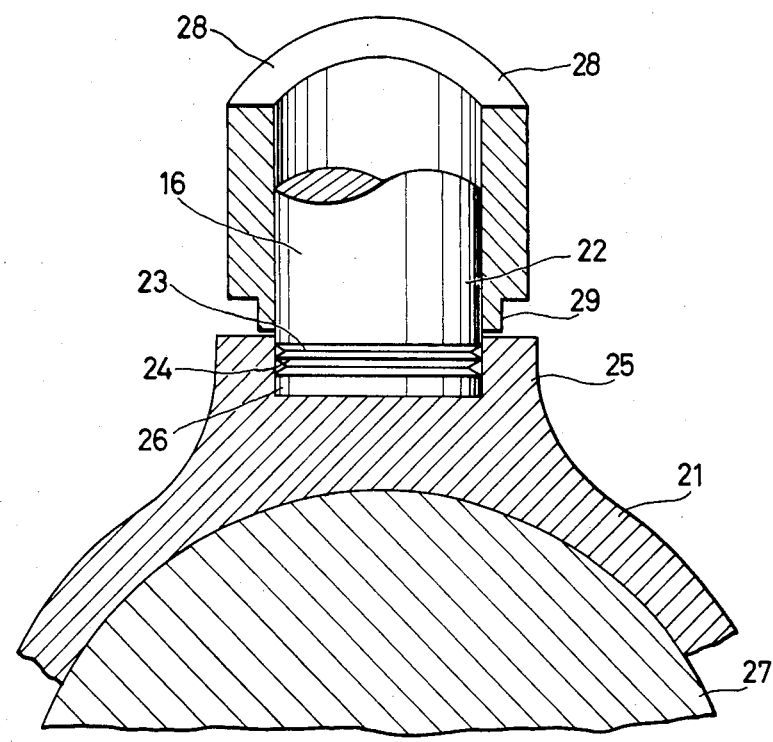
FIG. 4  FIG. 5  FIG. 6
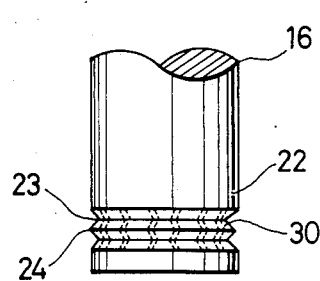 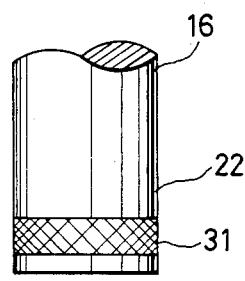 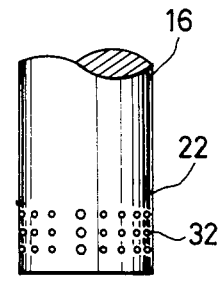

METHOD OF SECURING AN ELONGATED VIBRATION AMPLIFIER MEMBER TO AN ANNULAR VIBRATING REED

This application is a division of application Ser. No. 821,285, filed Jan. 22, 1986, now abandoned.

FIELD OF THE INVENTION

The present invention relates to a fuel atomizer.

BACKGROUND OF THE INVENTION

Heretofore, a carburetor system or injection valve system has been provided for controlling fuel supplied to internal combustion engines.

In these days, however, for the purpose of saving fuel consumption and reducing the amount of detrimental components in the exhaust, it has gained an importance to atomize fuel supplied from the above-mentioned fuel supply devices.

As means for atomizing fuel, there have been proposed fuel atomizers using ultrasonic vibrators, as disclosed in U.S. Pat. Nos. 4,019,683 and 4,237,836.

Such a fuel atomizer using a ultrasonic vibrator is designed to apply vibrations of the ultrasonic vibrator through a vibration amplifier member to a hollow tubular vibrating reed, which is fixed at the distal end of the vibration amplifier member.

In the fuel atomizer of this type, there is a significant problem in methods of fixing the vibrating reed to the vibration amplifier member. The above-mentioned prior patents disclose the method that the vibrating reed and the vibration amplifier member are formed simultaneously by casting, or that the vibrating reed is fixedly fastened to the vibration amplifier member by means of bolts.

However, the method resorting to casting accompanies a problem that the mold structure is complicated, and a porosity is formed in the interior of the cast, thus resulting in reduced mechanical strength, while the method resorting to bolts accompanies a problem that some minute gap inevitably remains between the vibrating reed and the vibration amplifier member, whereby the vibration energy will be atttenuated or the vibrating reed will eventually slip off.

OBJECT OF THE INVENTION

It is an object of the present invention to provide a way of fixing a vibrating reed and a vibration amplifier member to each other, so as to ensure substantial mechanical strength and reliable transmission of the vibration energy.

SUMMARY OF THE INVENTION

The present invention is featured in that one or more substantially annular recesses are formed at the distal end of a vibration amplifier member, and a part of the wall material of a vibrating reed is caused to flow into those recesses due to plastic fluidity, thereby firmly fixed both the vibrating reed and the vibration amplifier member to each other.

With this arrangement, the vibrating reed and the vibration amplifier member are formed of separate bodies, but are firmly united together. It is thus possible to overcome the problem attendant on casting, i.e., the occurrence of porosity, as well as the problem attendant on the use of bolts, i.e., attenuation of the vibration energy or slip-off of the vibrating reed.

BRIEF DESCRIPTION OF THE DRAWINGS

FIG. 3 is a sectional view for explaining the fixing method; and

FIGS. 4, 5 and 6 are views showing modified embodiments of the present invention.

DETAILED DESCRIPTION OF THE INVENTION

Figure 1:
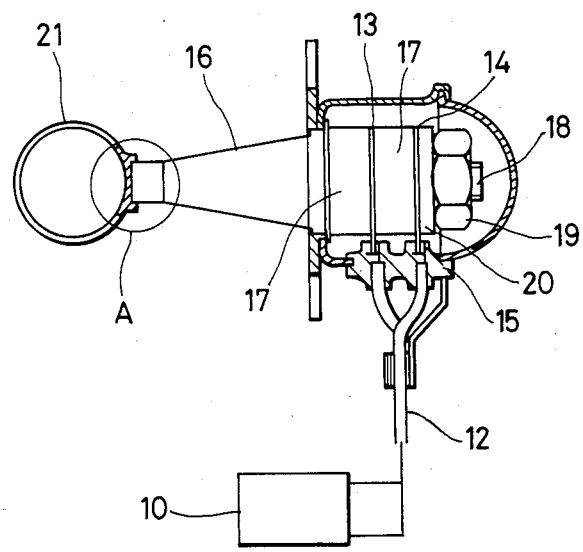
FIG. 1 is a constitutional view of a fuel atomizer.

Hereinafter, preferred embodiments of the present invention will be described in connection with the drawings. Referring to FIG. 1, high frequency voltage produced by a high frequency oscillator 10 is applied to a plus electrode 13 and a minus electrode 14 through lead wires 12.

The plus electrode 13 and the minus electrode 14 are each electrically insulated by a grommet 15 formed of insulative material, so that the main frequency voltage is applied to a pair of ultrasonic vibrators, for example, piezoelectric elements 17, which are disposed between the plus electrode 13 and the minus electrode 14 and between a vibration amplifier member 16 and the plus electrode 13.

The piezoelectric elements 17, plus electrode 13 and the minus electrode 14 are fixed in place through a spacer 20 by means of a bolt 18 anchored at the axis of the vibration amplifier member 16 and a nut 19 threaded over the bolt 18.

Each of the piezoelectric elements 17 undergoes an axial displacement in an amount proportional to the electric power, when the high frequency voltage is applied thereto, the displacement being amplified by the vibration amplifier member 16 and then transmitted to a hollow tubular vibrating reed 21.

The vibrating reed 21 has a specific resonance frequency depending on its material and shape, and resonates in a specific vibration mode when vibrations of that frequency are applied thereto through the vibration amplifier member 16. Accordingly, it is possible to atomize fuel by bringing the same into contact with the vibrating reed 21.

The foregoing is a basic constitution of the fuel atomizer. The present invention is directed to a union between the vibrating reed 21 and the vibration amplifier member 16, and one preferred embodiment thereof is illustrated in FIG. 2 showing a part A of FIG. 1 in enlarged scale.

Figure 2:
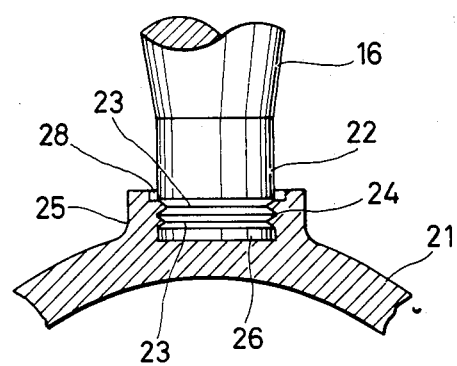
FIG. 2 is an enlarged sectional view of a part A in FIG. 1.

Referring to FIG. 2, the vibration amplifier member 16 is formed on the outer circumferential surface of its distal end 22 with a pair of annular grooves 23 each having a substantially triangular section and an annular projection 24 disposed therebetween and having a substantially triangular section. On the other hand, the vibrating reed 21 is formed in its thickened wall portion 25 with an accommodating hole 26 having an inner diameter slightly larger than an outer diameter of the distal end 22 of the vibration amplifier member 16.

Moreover, a part 28 of wall material of the vibration reed 21 is caused to flow into the annular groove 23 due to plastic fluidity, whereby the vibration reed 21 is very firmly united to the vibration amplifier member 16.

Next, the uniting method in this embodiment will be described in connection with FIG. 3.

First, a mandrel 27 is inserted through the central hollow portion of the vibrating reed 21 to set same into a fixed state.

The distal end 22 of the vibration amplifier member 16 is fitted in the accommodating hole 26 formed in the thickened wall portion 25 of the vibrating reed 21, for completing the setting of both components 16 and 21.

After that, a half-split pressure exerting tool 28 is placed to surround the vibration amplifier member 16 and urged toward the mandrel 27 by a press or the like.

With such operation, when an annular tooth 29 of the pressure exerting tool 28 is forcibly pushed into the thickened wall portion 25 of the vibrating reed 21, the material of the thickened wall portion 25 pressed by the annular tooth 29 is caused to flow into the annular grooves 23 formed at the distal end of the vibration amplifier member 16 due to plastic fluidity, thereby firmly permanently uniting the vibration reed 21 and the vibration amplifier member 16 together.

Because the vibration amplifier member 16 is formed of duralumin and the vibrating reed 21 is formed of aluminum, it will be understood that aluminum is easily subjected to plastic fluidity so as to flow into the annular grooves of duralumin.

It is a matter of course that available materials are not limited to those ones and various materials can selected on demand.

As mentioned above, since the vibration reed 21 and the vibration amplifier member 16 are formed of separate bodies, but firmly united together with the aid of plastic fluidity, this makes it possible to solve at once all the problems in the prior art; i.e., the occurrence of porosity, attenuation of the vibration energy, and slip-off of the vibrating reed.

Although in the foregoing embodiment the annular grooves 23 are formed at the distal end of the vibration amplifier member 16, the present invention may be modified as follows.

Referring first to FIG. 4, a multiplicity of grooves 30 each extending in the axial direction are formed over the surfaces of both the annular grooves 23 and the annular projection 24, so that the wall material of the vibrating reed 21 is caused to flow into the grooves 30, as well.

This structure is effective to prevent the vibrating reed 21 from rotating about the axis of the vibration amplifier member 16.

In the modified embodiment of FIG. 5, a knurled portion 31 is formed by a knurling tool on the outer circumferential surface of the distal end 22 of the vibration amplifier member 16.

In this embodiment, the vibrating reed 21 will not also be rotated with respect to the axis of the vibration amplifier member 16, and it is further surely prevented from slipping off.

Moreover, referring to FIG. 6, a multiplicity of holes 32 are formed in the outer circumferential surface of the distal end 22 of the vibration amplifier member 16. Also in this embodiment, the vibrating reed 21 will not be rotated with respect to the axis of the vibration amplifier member 16 and it is positively prevented from slipping off.

As fully described in the above, according to the present invention, since the vibrating reed and the vibration amplifier member are firmly united to each other due to plastic fluidity, the problems in the prior art, such as reduction in the mechanical strength attendant on the occurrence of porosity, attenuation of the vibration energy, and slip-off of the vibrating reed, can be all solved at once.

What is claimed is:

1. A method of securing an elongated vibration amplifier member having a distal end to an annular vibrating reed to form a part of a fuel atomizer, comprising the steps of:

forming at least one annular groove in the outer circumferential surface of the distal end of said elongated vibration amplifier member;

forming in the outer wall of said annular vibrating reed an accommodation hole having the same shape as and a slightly larger size than the distal end of said elongated vibration amplifier member;

fitting the distal end of said elongated vibration member into said accommodation hole in said annular vibrating reed; and applying pressure around the periphery of said accommodation hole to cause the material of the wall of said accommodation hole to flow into and fill the annular groove in said distal end of said elongated vibration amplifier member, thereby joining said vibrating reed to said vibration amplifier member.

2. A method according to claim 1, wherein a pair of annular grooves are formed in the distal end of said elongated vibration amplifier member, and the pressure applied to the periphery of said accommodation hole causes the material of the wall of the accommodation hole to flow into and fill both annular grooves.

3. A method according to claim 1, further comprising the step of forming a multiplicity of axially extending grooves over the surfaces of said annular groove.

4. A method according to claim 1, further comprising the step of forming a multiplicity of small holes in said annular groove.

* * * * *